US012637355B2

(12) United States Patent
Hashimoto et al.

(10) Patent No.: US 12,637,355 B2
(45) Date of Patent: May 26, 2026

(54) METHOD FOR GENERATING CARBON MONOXIDE, METHOD FOR PRODUCING PRECURSOR, AND MATERIAL FOR CHEMICAL LOOPING SYSTEM

(71) Applicants: ENEOS Corporation, Tokyo (JP); WASEDA UNIVERSITY, Tokyo (JP)

(72) Inventors: Yasushi Hashimoto, Tokyo (JP); Yasushi Sato, Tokyo (JP); Yasushi Sekine, Tokyo (JP)

(73) Assignees: ENEOS CORPORATION, Tokyo (JP); WASEDA UNIVERSITY, Tokyo (JP)

( * ) Notice: Subject to any disclaimer, the term of this patent is extended or adjusted under 35 U.S.C. 154(b) by 831 days.

(21) Appl. No.: 17/759,933

(22) PCT Filed: Jan. 20, 2021

(86) PCT No.: PCT/JP2021/001762
§ 371 (c)(1),
(2) Date: Aug. 2, 2022

(87) PCT Pub. No.: WO2021/157350
PCT Pub. Date: Aug. 12, 2021

(65) Prior Publication Data
US 2023/0077049 A1 Mar. 9, 2023

(30) Foreign Application Priority Data
Feb. 5, 2020 (JP) ................................. 2020-018155

(51) Int. Cl.
*C01B 32/40* (2017.01)

(52) U.S. Cl.
CPC .................................... *C01B 32/40* (2017.08)

(58) Field of Classification Search
None
See application file for complete search history.

(56) References Cited

U.S. PATENT DOCUMENTS

2014/0070144 A1 3/2014 Chalabi et al.
2014/0377158 A1 12/2014 Andrus et al.
(Continued)

FOREIGN PATENT DOCUMENTS

CN 1223474 A 7/1999
CN 103230799 A 8/2013
(Continued)

OTHER PUBLICATIONS

Larrazabal et al. "Enhanced Reduction of CO2 to CO . . . ". ACS Catal. 6, 6265-6274 (2016). (Year: 2016).*
(Continued)

*Primary Examiner* — Sheng H Davis
(74) *Attorney, Agent, or Firm* — BUCHANAN, INGERSOLL & ROONEY PC

(57) ABSTRACT

A method for generating carbon monoxide includes: a generation step of generating carbon monoxide by supplying carbon dioxide to a first material containing a first element included in elements of group 11 and a second element included in elements of groups 8 to 10, 12, and 13; and a reduction step of reducing the second element oxidized in the generation step by supplying hydrogen to a second material containing the oxidized second element and the first element. The generation step and the reduction step are repeated a plurality of times.

4 Claims, 1 Drawing Sheet

(56) References Cited

U.S. PATENT DOCUMENTS

| | | |
|---|---|---|
| 2018/0207599 A1 | 7/2018 | Metcalfe |
| 2019/0085473 A1 | 3/2019 | Sugano et al. |

FOREIGN PATENT DOCUMENTS

| | | | |
|---|---|---|---|
| CN | 103687665 A | | 3/2014 |
| CN | 103861597 A | | 6/2014 |
| CN | 105110332 A | | 12/2015 |
| CN | 107754815 A | | 3/2018 |
| CN | 110433813 | * | 11/2019 |
| JP | H07136462 A | | 5/1995 |
| JP | 2014528884 A | | 10/2014 |
| JP | 2015016467 A | | 1/2015 |
| JP | 2018529504 A | | 10/2018 |
| JP | 2019051493 A | | 4/2019 |
| WO | 2019/099795 A1 | | 5/2019 |
| WO | 2019163968 A1 | | 8/2019 |

OTHER PUBLICATIONS

Xiang et al. "Copper-Indium Binary Catalyst on a gas diffusion electrode . . . ". ACS Appl. Mater. Interfaces, 12, 601-608 (2020). Received Sep. 2019. (Year: 2020).*

Office Action (Communication pursuant to Rule 114(2) EPC/Third Party Observation) issued on May 15, 2025, in corresponding European Patent Application No. 21750719.3. (15 pages).

Tsoukalou et al., "Structural Evolution and Dynamics of an In2O3 Catalyst for CO2 Hydrogenation to Methanol: An Operando XAS-XRD and In Situ TEM Study", Journal of the American Chemical Society, (2019), 141, pp. 13497-13505.

Supporting Information for TM1, "The Structural Evolution of In2O3 Catalyst for Hydrogenation of CO2 to Methanol: an Operando XAS-XRD and in situ TEM Study". (30 pages).

R.H. Piva et al., "Thermal stability and phase transformation in fully indium oxide (In01.5) stabilized zirconia", Materials Characterization, (2017), 123, pp. 58-66.

H.C. Shin et al., "Mechanism of M Ferrites (M = Cu and Ni) in the CO2 Decomposition Reaction", Chemistry of Materials, (2001), vol. 13, No. 4, pp. 1238-1242.

Series in Materials, Science and Engineering: Fundamental of Ceramics, edited by M.W. Barsoum, Taylor & Francis Group, LLC 2003, pp. 532-533. (3 pages).

M.A. Dar et al., "Effect of d-block element Co2+ substitution on structural, Mössbauer and dielectric properties of spinel copper ferrites", Journal of Magnetism and Magnetic Materials, (2017), 436, pp. 101-112.

"Indium Oxide (In2O3) Nanopowder/Nanoparticles". (4 pages).

Yu Qiu et al., "Copper and cobalt co-doped ferrites as effective agents for chemical looping CO2 splitting", Chemical Engineering Journal 387, (2020), 124150. (7 pages).

CN Office Action issued in CN Application No. 202180012744.3; Mailed Mar. 15, 2023, 11 Pages (with Translation).

International Search Report (PCT/ISA/210) and Written Opinion (PCT/ISA/237), with English translations, dated Apr. 6, 2021, for International Application No. PCT/JP2021/001762.

Guo Weiwei et al., "Metal-Organic Framework-Derived Indium-Copper Bimetallic Oxide Catalysts for Selective Aqueous Electroreduction of CO2", Green Chemistry, Feb. 4, 2019, vol. 21, No. 3, pp. 503-508, XP093120146.

Office Action (Communication pursuant to Rule 164(1) EPC) issued on Feb. 1, 2024, in corresponding European Patent Application No. 21750719.3. (15 pages).

Xiang Hang et al., "Copper-Lndium Binary Catalyst on a Gas Diffusion Electrode for High-Performance CO2 Electrochemical Reduction With Record CO Production Efficiency", Applied Materials & Interfaces, vol. 12, No. 1, Jan. 8, 2020, pp. 601-608, XP093120102.

"Steel oxide nanoparticles (In2O3 research grade)" and partial machine English translation. (4 pages).

"Inorganic Chemistry A Modern Approach" and partial machine English translation. (3 pages).

"Schreiber-Atkins Inorganic Chemistry" and partial machine English translation. (3 pages).

"Inorganic Materials Science for Engineering" and partial machine English translation. (6 pages).

"On the corrosion resistance of ceramics" and partial machine English translation. (11 pages).

Yu Qiu et al., "Efficient CO 2 to CO conversion at moderate temperatures enabled by the cobalt and copper co-doped ferrite oxygen carrier", Journal of Energy Chemistry, 46, (2020), pp. 123-132. (10 pages).

"Particle size—Particle size distribution" and partial machine English translation. (17 pages).

Jianyang Wang et al., "Variation in the In2O3 Crystal Phase Alters Catalytic Performance toward the Reverse Water Gas Shift Reaction", ACS Catal., (2020), 10, pp. 3264-3273. (10 pages).

Office Action (Notice of Reasons for Cancellation) issued on Mar. 26, 2025, in corresponding Japanese Patent Application No. 2024-701147 and machine English translation of the Office Action. (62 pages).

Office Action (Statement of Evidence) issued on Mar. 3, 2025, in corresponding Japanese Patent Application No. 2020-018155 and machine English translation of the Office Action. (7 pages).

Office Action (Statement of Objections) issued on Mar. 3, 2025, in corresponding Japanese Patent Application No. 2020-018155 and machine English translation of the Office Action. (99 pages).

Office Action (Notification of Reason(s) for Refusal) issued on Dec. 26, 2023, in corresponding Japanese Patent Application No. 2020-018155 and English machine translation of the Office Action. (3 pages).

Office Action (Communication pursuant to Article 94(3) EPC) issued on Sep. 29, 2025, in corresponding European Patent Application No. 21750719.3. (5 pages).

Office Action (Notice of Reason for Rejection of Amendment) issued on Nov. 13, 2025, in corresponding Japanese Patent Application No. 2020-018155 (Patent No. 7491505) and machine English translation of the Office Action. (51 pages).

Office Action (Notice of Grounds for Cancellation) issued on Feb. 27, 2026, in corresponding Japanese Patent Application No. 2024-701147 (Patent No. 7491505) and machine English translation of the Office Action. (125 pages).

Office Action (Notice of Delivery of a Copy of the Statement of Opinion) issued on Feb. 27, 2026, in corresponding Japanese Patent Application No. 2024-701147 (Patent No. 7491505) and machine English translation of the Office Action. (40 pages).

Office Action (Communication pursuant to Article 94(3) EPC) issued on Mar. 25, 2026, in corresponding European Patent Application No. 21750719.3. (5 pages).

Hirunsit et al., "Cu—Cr, Cu—Mn, and Cu—Fe Spinel-Oxide-Type Catalysts for Reforming of Oxygenated Hydrocarbons", The Journal of Physical Chemistry C2013, (Aug. 8, 2025), No. 117, p. 23757-23765.

Qiu et al., "Enhanced Hydrogen Production Performance at Intermediate Temperatures Through the Synergistic Effects of Binary Oxygen Carriers", Applied Energy 252 (2019) 113454, Aug. 8, 2025. (10 pages).

Fujifilm Wako Pure Chemical Corporation, "Safety Data Sheet", (Aug. 21, 2025) and machine English translation. https://labchem-wako.fujifilm.com/sds/WOIW0105-0098JGHEJP.pdf. (19 pages).

Office Action (Examination report No. 1 for standard patent application) issued on Mar. 12, 2026, in corresponding Australian Patent Application No. 2021217843. (5 pages).

* cited by examiner

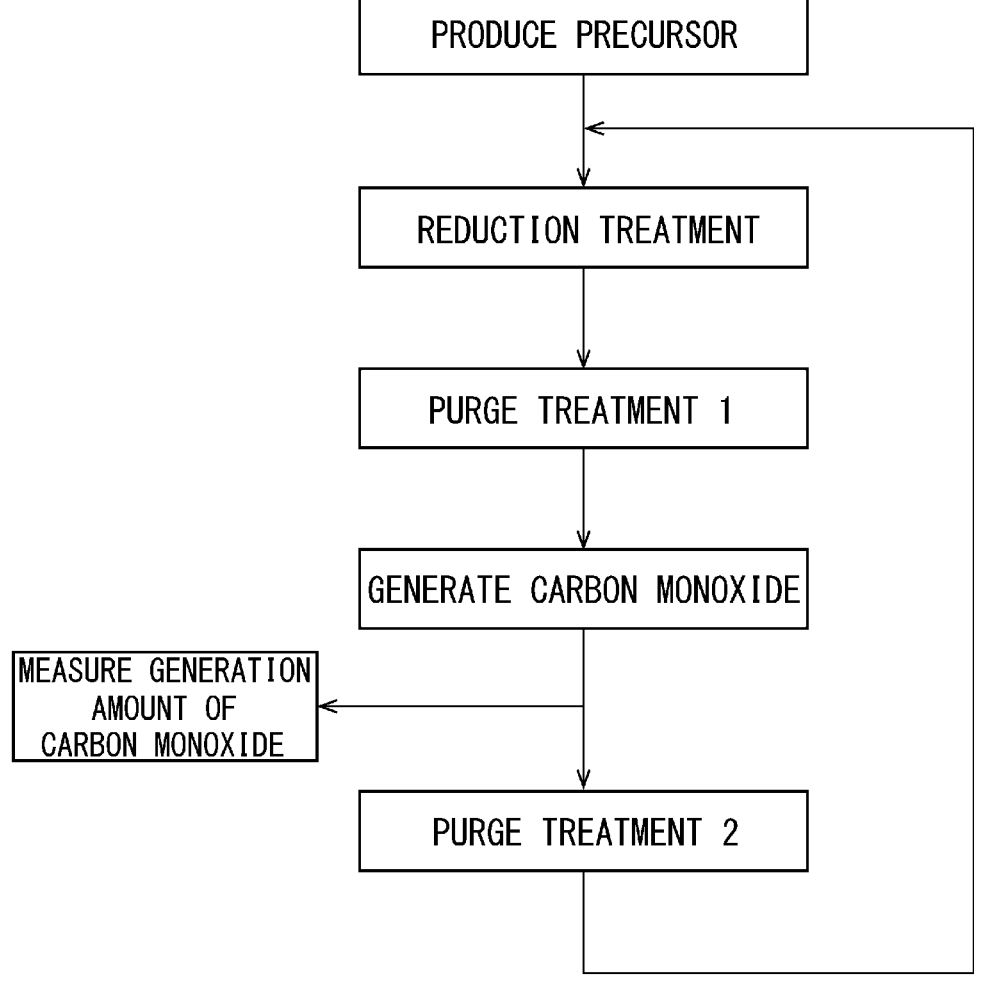

METHOD FOR GENERATING CARBON MONOXIDE, METHOD FOR PRODUCING PRECURSOR, AND MATERIAL FOR CHEMICAL LOOPING SYSTEM

CROSS-REFERENCE TO RELATED APPLICATIONS

This application is based upon and claims the benefit of priority from the prior Japanese Patent Application No. 2020-018155, filed on Feb. 5, 2020, and International Patent Application No. PCT/JP2021/001762, filed on Jan. 20, 2021, the entire content of each of which is incorporated herein by reference.

BACKGROUND

Field of the Invention

The present invention relates to generation of carbon monoxide.

Description of the Related Art

Conventionally, a chemical looping type reactor that reduces carbon dioxide contained in an exhaust gas to generate carbon monoxide has been devised. This reactor includes a first reactor that performs a first reaction of reducing carbon dioxide to carbon monoxide using a metal oxide catalyst, a second reactor that performs a second reaction of reducing the metal oxide catalyst by oxidizing hydrogen to water, and a catalyst circulation path that circulates the metal oxide catalyst between the two reactors (see Patent Literature 1).

Patent Literature 1: WO 2019/163968 A

Even with a conventional material used in a chemical looping type reaction, carbon monoxide can be generated, but there is room for further improvement from a viewpoint of practical use such as the generation amount of carbon monoxide or durability.

SUMMARY OF THE INVENTION

The present invention has been made in view of such a situation, and an object thereof is to provide a new technique for efficiently generating carbon monoxide by reducing carbon dioxide.

In order to solve the above problem, a method for generating carbon monoxide according to an aspect of the present invention includes: a generation step of generating carbon monoxide by supplying carbon dioxide to a first material containing a first element included in elements of group 11 and a second element included in elements of groups 8 to 10, 12, and 13; and a reduction step of reducing the second element oxidized in the generation step by supplying hydrogen to a second material containing the oxidized second element and the first element. The generation step and the reduction step are repeated a plurality of times.

BRIEF DESCRIPTION OF THE DRAWINGS

Embodiments will now be described, by way of example only, with reference to the accompanying drawings which are meant to be exemplary, not limiting, in which:

FIG. 1 is a diagram schematically illustrating steps for describing a chemical looping system according to the present embodiment.

DETAILED DESCRIPTION OF THE INVENTION

First, aspects of the present invention will be listed.

A method for generating carbon monoxide according to an aspect of the present invention includes: a generation step of generating carbon monoxide by supplying carbon dioxide to a first material containing a first element included in elements of group 11 and a second element included in elements of groups 8 to 10, 12, and 13; and a reduction step of reducing the second element oxidized in the generation step by supplying hydrogen to a second material containing the oxidized second element and the first element. The generation step and the reduction step are repeated a plurality of times.

According to this aspect, carbon monoxide can be efficiently generated by reducing carbon dioxide. Note that the elements of group 8 are Fe, Ru, and Os, the elements of group 9 are Co, Rh, and Ir, the elements of group 10 are Ni, Pd, and Pt, the elements of group 11 are Cu, Ag, and Au, the elements of group 12 are Zn, Cd, and Hg, and the elements of group 13 are B, Al, Ga, In, and Tl.

The first material may contain indium oxide and copper, and the second material may contain indium oxide and copper. The indium oxide contained in the second material may be $In_2O_3$.

The indium oxide may have an average particle size of 90 nm or less.

The first material may contain iron and copper, and the second material may contain iron oxide and copper. The iron oxide contained in the second material may be $Fe_3O_4$.

Another aspect of the present invention is a method for producing a precursor. This method is a method for producing a precursor of a material for a chemical looping system that repeatedly generates carbon monoxide, and includes: a first heat treatment step of heat-treating an aqueous solution containing a nitrate of a first element included in elements of group 11, a nitrate of a second element included in elements of groups 8 to 10, 12, and 13, and citric acid at a temperature of lower than 100° C.; a second heat treatment step of heat-treating the aqueous solution at a temperature of 100° C. or higher and removing an organic substance to obtain an intermediate; and a firing step of firing the intermediate to produce a precursor formed of a composite oxide containing the first element and the second element.

According to this aspect, a precursor suitable for a material for a chemical looping system for efficiently generating carbon monoxide can be produced.

The first element may be copper, and the second element may be indium. Alternatively, the first element may be copper, and the second element may be iron.

Still another aspect of the present invention is a material for a chemical looping system. This material is a material for a chemical looping system that repeatedly generates carbon monoxide, and contains copper and indium oxide. The indium oxide has an average particle size of 90 nm or less.

According to this aspect, carbon monoxide can be efficiently generated by reducing carbon dioxide.

Note that any combination of the above constituent elements and modifications of the expressions of the present invention among methods, apparatuses, systems, and the like are also effective as aspects of the present invention. In addition, an appropriate combination of the above-described elements can also be included in the scope of the invention for which patent protection is sought by the present patent application.

Hereinafter, the present invention will be described based on a preferred embodiment. The embodiment does not limit the invention and is described for illustrative purposes, and all the features described in the embodiment and a combination thereof are not necessarily essential to the invention. The same or equivalent constituent elements, members, and treatments illustrated in the drawings are denoted by the same reference numerals, and duplicative description will be omitted appropriately. In addition, the scale and shape of each part illustrated in the drawings are set for convenience in order to facilitate description, and are not limitedly interpreted unless otherwise specified. In addition, even in a case of the same member, the scale and the like may be slightly different between the drawings. In addition, terms "first", "second", and the like used in the present specification or claims do not represent any order or importance unless otherwise specified, and are intended to distinguish one configuration from another configuration.

Chemical Looping System

First, an outline of a chemical looping system according to the present embodiment will be described. In the present embodiment, carbon monoxide is generated from carbon dioxide. FIG. 1 is a diagram schematically illustrating steps for describing the chemical looping system according to the present embodiment. As illustrated in FIG. 1, first, a precursor of a material for the chemical looping system is produced. This precursor is a composite oxide that functions as an oxygen carrier, and can be a material for the chemical looping system by a subsequent reduction treatment.

The precursor is changed to a material or a form contributing to generation of carbon monoxide by a reduction treatment. Thereafter, a purge treatment 1 is performed, and then a step of generating carbon monoxide from carbon dioxide is performed. In this step, the generation amount of carbon monoxide is measured, and the performance of the material for the chemical looping system is evaluated. Thereafter, a purge treatment 2 is performed, and then the reduction treatment is performed again. The performance of the material can also be evaluated by measuring how much the generation amount of carbon monoxide changes in each cycle when the cycle of the steps from the reduction treatment to the purge treatment 2 is repeated.

Example 1

Preparation of Oxygen Carrier 5.53 g of a nitrate of copper included in elements of group 11, $Cu(NO_3)_2.3H_2O$ (manufactured by KANTO CHEMICAL CO., INC.), 8.13 g of a nitrate of indium included in elements of group 13, $In(NO_3)_2 \cdot nH_2O$ (manufactured by KANTO CHEMICAL CO., INC.), 29.01 g of citric acid monohydrate (manufactured by Wako Pure Chemical Industries, Ltd.), and 8.57 g of ethylene glycol (manufactured by Wako Pure Chemical Industries, Ltd.) were dissolved in 300 mL of pure water, and were subjected to a heat treatment at 85° C. for 18 hours in a water bath. After the heat treatment, the mixture was heated to about 300° C. on a hot stirrer, and an organic substance was removed. Thereafter, the temperature of the residue was raised from room temperature to 400° C. at a temperature rising rate of 5° C./min in the air in a firing furnace and held for 2 hours. Subsequently, the temperature was raised to 850° C. at a temperature rising rate of 10° C./min and held for 10 hours to obtain 5.0 g of a copper-indium-based oxygen carrier $Cu_2In_2O_5$ (hereinafter, referred to as "carrier 1").

Reduction Treatment

Next, 0.5 g of the carrier 1 is charged in a reaction tube, and a 10 vol % $H_2$/Ar gas was caused to flow through the reaction tube at a flow rate of 200 Ncc/min under atmospheric pressure. Then, the temperature of the reaction tube was raised from room temperature to 500° C. over one hour, and a reduction treatment was performed at 500° C. for 30 minutes. In the first reduction treatment, a reduction reaction of the following formula (1-1) occurs.

$$Cu_2In_2O_5 + 3H_2 \rightarrow 2Cu/InO + 3H_2O \qquad \text{Formula (1-1)}$$

In addition, a reduction reaction of the following formula (1-2) occurs in a sample after a carbon monoxide generation test described later.

$$In_2O_3 + 2H_2 \rightarrow In_2O + 2H_2O \qquad \text{Formula (1-2)}$$

Note that the particle size of the sample after the reduction treatment was calculated from the Scherrer's equation using XRD.

Purge Treatment 1

After the reduction treatment was performed, argon was caused to flow through the system at 200 Ncc/min for 10 minutes while the temperature was maintained at 500° C., and the inside of the system was purged.

Carbon Monoxide Generation Test

After the inside of the system was purged, a 40 vol % $CO_2$/Ar gas was caused to flow through the system at a flow rate of 200 Ncc/min for 10 minutes while the temperature was maintained at 500° C. In analysis of a reaction product, a mass spectrometer was connected to an outlet, and generated carbon monoxide was quantified using a mass number of 28 for carbon monoxide. In this step, a reaction of the following formula (1-3) occurs.

$$In_2O + 2CO_2 \rightarrow In_2O_3 + 2CO \qquad \text{Formula (1-3)}$$

Purge Treatment 2

After the carbon monoxide generation test, argon was caused to flow through the system at 200 Ncc/min for 10 minutes while the temperature was maintained at 500° C., and the inside of the system was purged.

Cycle Test

A cycle test of carbon monoxide generation was performed by repeating the reduction treatment to the purge treatment 2 four times.

Example 2

A treatment similar to Example 1 was performed except that 5.05 g of a nitrate of copper included in elements of group 11, $Cu(NO_3)_2.3H_2O$ (manufactured by KANTO CHEMICAL CO., INC.), 17.06 g of a nitrate of iron included in elements of group 8, $Fe(NO_3)_3.9H_2O$ (manufactured by KANTO CHEMICAL CO., INC.), 39.73 g of citric acid monohydrate (manufactured by Wako Pure Chemical Industries, Ltd.), and 11.73 g of ethylene glycol (manufactured by Wako Pure Chemical Industries, Ltd.) were used to obtain 5.0 g of a copper-iron-based oxygen carrier $CuFe_2O_4$. After the reduction treatment, a treatment similar to Example 1 was performed.

Note that a reaction regarding Example 2 is as follows. In the first reduction treatment, a reduction reaction of the following formula (2-1) occurs.

$$CuFe_2O_4+4H_2 \rightarrow Cu/2Fe+4H_2O \qquad \text{Formula (2-1)}$$

In addition, a reduction reaction of the following formula (2-2) occurs in a sample after the carbon monoxide generation test.

$$Fe_3O_4+4H_2 \rightarrow 3Fe+4H_2O \qquad \text{Formula (2-2)}$$

In addition, a reaction of the following formula (2-3) occurs in the carbon monoxide generation test.

$$3Fe+4CO_2 \rightarrow Fe_3O_4+4CO \qquad \text{Formula (2-3)}$$

Example 3

A treatment similar to Example 1 was performed except that the temperatures of the reduction treatment, the purge treatment, and the carbon monoxide generation test were set to 450° C., and the number of cycles was set to 1.

Example 4

A treatment similar to Example 1 was performed except that the temperatures of the reduction treatment, the purge treatment, and the carbon monoxide generation test were set to 400° C.

Example 5

A treatment similar to Example 1 was performed except that the temperatures of the reduction treatment, the purge treatment, and the carbon monoxide generation test were set to 350° C.

Example 6

A treatment similar to Example 1 was performed except that a 30 volume % $CO_2$/Ar gas was used, and the number of cycles was set to 1 in the carbon monoxide generation test of Example 1.

Example 7

A treatment similar to Example 6 was performed except that a 20 volume % $CO_2$/Ar gas was used in the carbon monoxide generation test of Example 6.

Example 8

A treatment similar to Example 6 was performed except that a 10 volume % $CO_2$/Ar gas was used in the carbon monoxide generation test of Example 6.

Example 9

A treatment similar to Example 6 was performed except that a 5 volume % $CO_2$/Ar gas was used in the carbon monoxide generation test of Example 6.

Comparative Example 1

A treatment similar to Example 1 was performed except that 12.80 g of a nitrate of indium, $In(NO_3)_3 \cdot nH_2O$ (manufactured by KANTO CHEMICAL CO., INC.), 22.82 g of citric acid monohydrate (manufactured by Wako Pure Chemical Industries, Ltd.), and 6.74 g of ethylene glycol (manufactured by Wako Pure Chemical Industries, Ltd.) were used to obtain 5.0 g of $In_2O_3$. Therefore, $In_2O_3$ is not a composite oxide but an oxide of indium.

Comparative Example 2

To 1.90 g of $In_2O_3$ prepared in Comparative Example 1, 20 mL of pure water was added, and the mixture was stirred for 2 hours under reduced pressure using an evaporator. Thereafter, 0.38 g of $Cu(NO_3)_2 \cdot 9H_2O$ (manufactured by KANTO CHEMICAL CO., INC.) was added thereto, and the mixture was stirred under normal pressure for 2 hours. Thereafter, the temperature of the mixture was raised from room temperature to 500° C. at a temperature rising rate of 5° C./min in the air in a firing furnace and then held for 5 hours to obtain 2.0 g of 5 wt % $Cu/In_2O_3$.

Comparative Example 3

A treatment similar to Example 1 was performed except that commercially available $Fe_3O_4$ (manufactured by Wako Pure Chemical Industries, Ltd.) was used as the oxygen carrier.

Evaluation Results

The particle size of indium oxide after reduction according to Example 1 and the particle size of indium oxide according to Comparative Example 2 are presented in Table 1.

TABLE 1

|  | Example 1 | Comparative Example 2 |
| --- | --- | --- |
| Particle size of indium oxide [nm] | 60 | 95 |

As presented in Table 1, the particle size of the indium oxide produced via a copper-indium-based oxygen carrier is very fine as compared with that of the indium oxide produced by a general method.

Next, a change in the generation amount of CO depending on the number of cycles is presented in Table 2.

TABLE 2

|  | Generation amount of CO [mmol/g] | | | | |
| --- | --- | --- | --- | --- | --- |
| Number of cycles | Example 1 | Example 2 | Comparative Example 1 | Comparative Example 2 | Comparative Example 3 |
| 1 | 4 | 1.8 | 1 | 0.8 | 1.1 |
| 2 | 4.1 | 2.4 | 1 | 0.9 | 1.2 |
| 3 | 4.1 | 2.4 | 1 | 1.1 | 1.2 |
| 4 | 4 | 2.4 | 1 | 0.9 | 1.2 |

As presented in Table 2, in the case of the indium oxide and the iron oxide according to Examples 1 and 2, the generation amount of CO is large, and the generation amount of CO does not decrease at least when the number of cycles is four or less. On the other hand, in the case of the indium oxide and the iron oxide according to Comparative Examples 1 to 3, the generation amount of CO hardly decreases with an increase in the number of cycles, but the generation amount of CO itself is not large.

Next, Table 3 presents how the generation amount of CO after the reduction treatment varies depending on the temperature at the time of the reduction treatment.

TABLE 3

|  | Temperature [° C.] | Generation amount of CO (first cycle) [mmol/g] |
|---|---|---|
| Example 1 | 500 | 4 |
| Example 3 | 450 | 3.1 |
| Example 4 | 400 | 1.7 |
| Example 5 | 350 | 0.6 |

As presented in Table 3, it has been found that the generation amount of CO decreases as the temperature is lowered in order of Examples 1, 3, 4, and 5, but CO is generated up to 350° C.

Next, a difference in the generation amount of CO due to a difference in a $CO_2$ concentration is presented in Table 4.

TABLE 4

|  | CO2 concentration [vol %] | Generation amount of CO (first cycle) [mmol/g] |
|---|---|---|
| Example 1 | 40 | 4 |
| Example 6 | 30 | 4 |
| Example 7 | 20 | 4 |
| Example 8 | 10 | 4 |
| Example 9 | 5 | 4 |

As presented in Table 4, even when the $CO_2$ concentration changes in a range of 5 to 40 vol %, the generation amount of CO hardly changes.

Although the present invention has been described with reference to the above-described embodiment, the present invention is not limited to the above-described embodiment, and configurations obtained by appropriately combining or replacing the configurations of the embodiment are also included in the present invention. In addition, it is also possible to appropriately recombine the combinations and the order of treatments in the embodiment on the basis of knowledge of those skilled in the art and to add modifications such as various design changes to the embodiment, and an embodiment to which such modifications are added can also be included in the scope of the present invention.

The invention claimed is:

1. A method for generating carbon monoxide, the method comprising:
   a first reduction step of generating water and a first material containing copper and indium by supplying hydrogen to a precursor that is a composite oxide containing $Cu_2In_2O_5$, thereby reducing the precursor;
   a generation step of generating carbon monoxide by supplying carbon dioxide to the first material and generating a second material by oxidizing the indium; and
   a second reduction step of generating the first material by reducing the indium oxidized by supplying hydrogen to the second material, wherein
   the generation step and the second reduction step are repeated a plurality of times after the first reduction step.

2. The method for generating carbon monoxide according to claim 1, wherein the oxidized indium is $In_2O_3$.

3. The method for generating carbon monoxide according to claim 1, wherein the first material contains indium oxide, and the indium oxide has a particle size of 90 nm or less.

4. The method for generating carbon monoxide according to claim 1, further comprising a step of producing a precursor before the first time first reduction step, the step of producing a precursor comprising:
   a first heat treatment step of heat-treating an aqueous solution containing a nitrate of the copper, a nitrate of the indium, and citric acid at a temperature of lower than 100° C.;
   a second heat treatment step of heat-treating the aqueous solution at a temperature of 100° C. or higher and removing an organic substance to obtain an intermediate; and
   a firing step of firing the intermediate to produce the precursor.

* * * * *